Oct. 6, 1959 T. A. BADEN ET AL 2,907,406
DRY TYPE AIR CLEANER
Filed Jan. 2, 1957 3 Sheets-Sheet 1

INVENTORS
THOMAS A. BADEN
LAWRENCE J. OLSON
HAROLD L. MILLER
KENNETH W. COPP
BY
Merchant & Merchant
ATTORNEYS

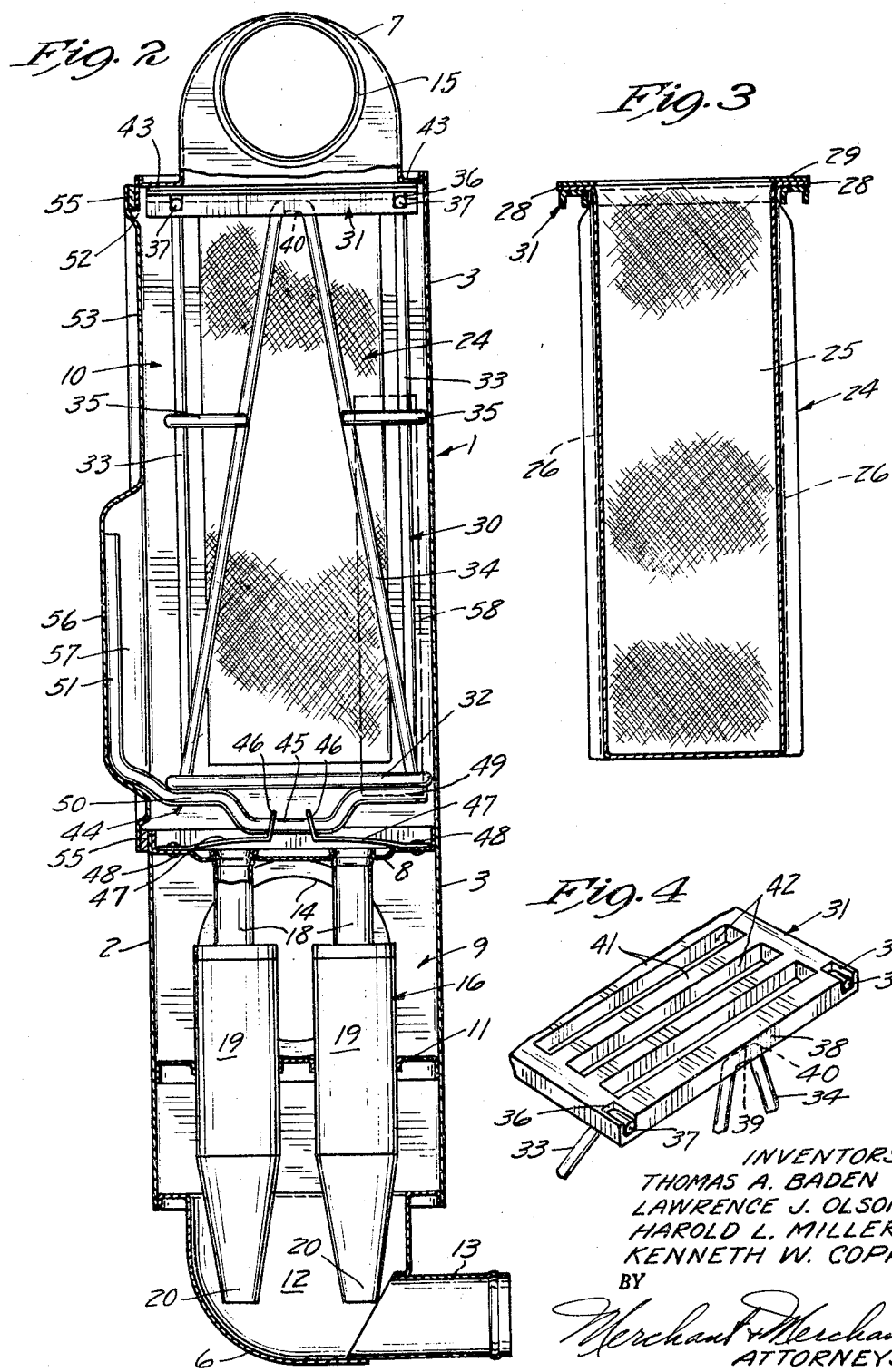

Oct. 6, 1959     T. A. BADEN ET AL     2,907,406
DRY TYPE AIR CLEANER
Filed Jan. 2, 1957     3 Sheets-Sheet 3
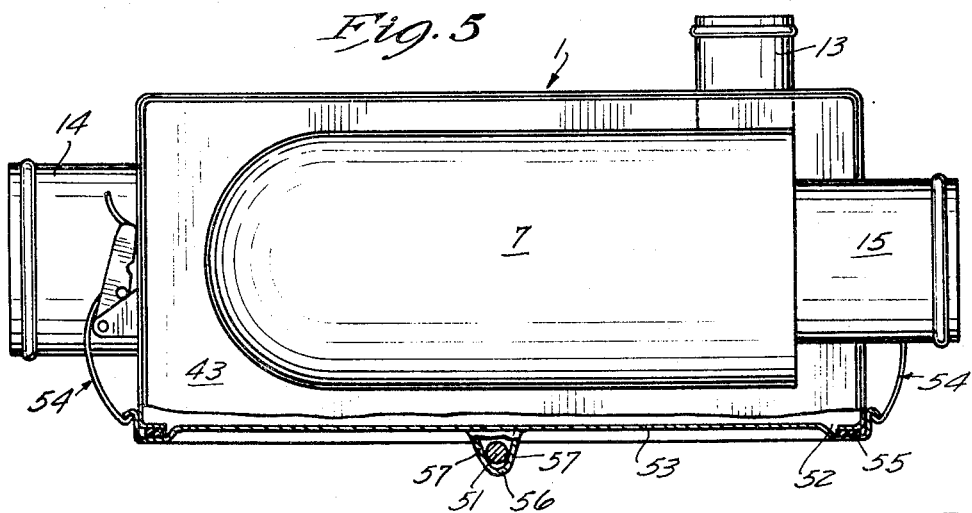
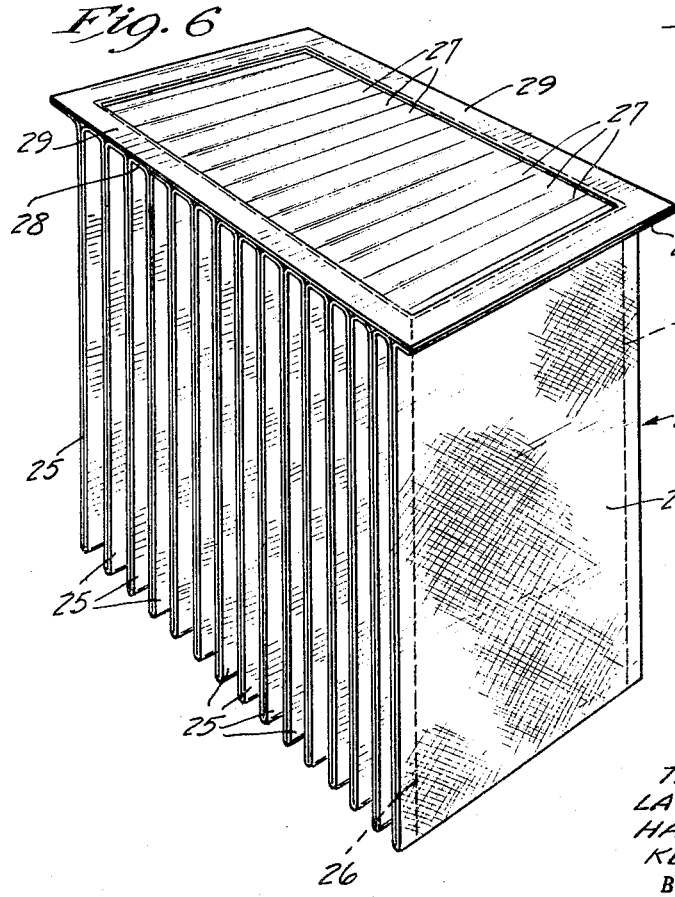
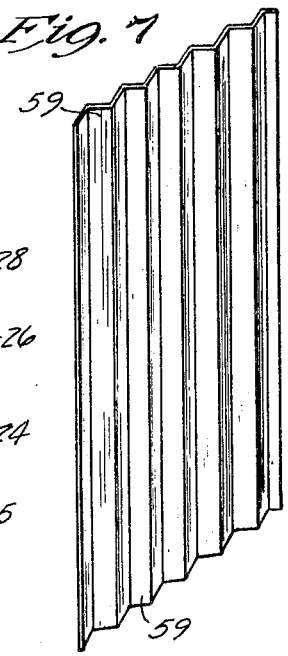
INVENTORS
THOMAS A. BADEN
LAWRENCE J. OLSON
HAROLD L. MILLER
KENNETH W. COPP
BY
Merchant & Merchant
ATTORNEYS

United States Patent Office 2,907,406
Patented Oct. 6, 1959

2,907,406

DRY TYPE AIR CLEANER

Thomas A. Baden, Richfield, Lawrence J. Olson, St. Paul, Harold L. Miller, Minneapolis, and Kenneth W. Copp, St. Paul, Minn., assignors to Donaldson Company, Inc., St. Paul, Minn., a corporation of Delaware Application January 2, 1957, Serial No. 632,159

8 Claims. (Cl. 183—62)

Our invention relates generally to air cleaners and more specifically to dry-type air cleaners adapted for use in vehicles and such installations wherein liquid bath type air cleaners are not desirable.

One of the objects of our invention is the provision of an air cleaner having a dry filter element which may be quickly and easily removed for cleaning and as quickly and easily replaced.

Another object of our invention is the provision of an air cleaner comprising housing structure defining an opening for insertion and removal of a filter element, and including a closure element for said opening, means for releasably locking the filter element in place and preventing the closure element from properly closing said opening when the filter element is improperly placed within the housing.

Another object of our invention is the provision of novel means for preventing accidental displacement of the filter element locking means.

Still another object of our invention is the provision of a filter element comprising a plurality of upwardly opening pockets made from flexible porous sheet material and joined at their upper ends, and of novel separating plates in each of said pockets for permitting free movement of air through the filter material and upwardly from said pockets.

The above and still further highly important objects and advantages of our invention will become apparent from the following detailed specification, appended claims, and attached drawings.

Referring to the drawings, which illustrate the invention, and in which like reference characters indicate like parts throughout the several views:

Fig. 2 is a view in transverse section taken substantially on the line 2—2 of Fig. 1;

Fig. 3 is a fragmentary detail in section taken on the line 3—3 of Fig. 1, some parts being removed;

Fig. 4 is a fragmentary detail in perspective of the filter mounting frame of our invention;

Fig. 5 is a view in top plan of the air cleaner of Fig. 1, some parts being broken away and some parts shown in section;

Fig. 6 is a view in perspective of the filter element of our invention; and

Fig. 7 is a view in perspective of a separator plate utilized with the filter element of Fig. 6.

Figure 1:
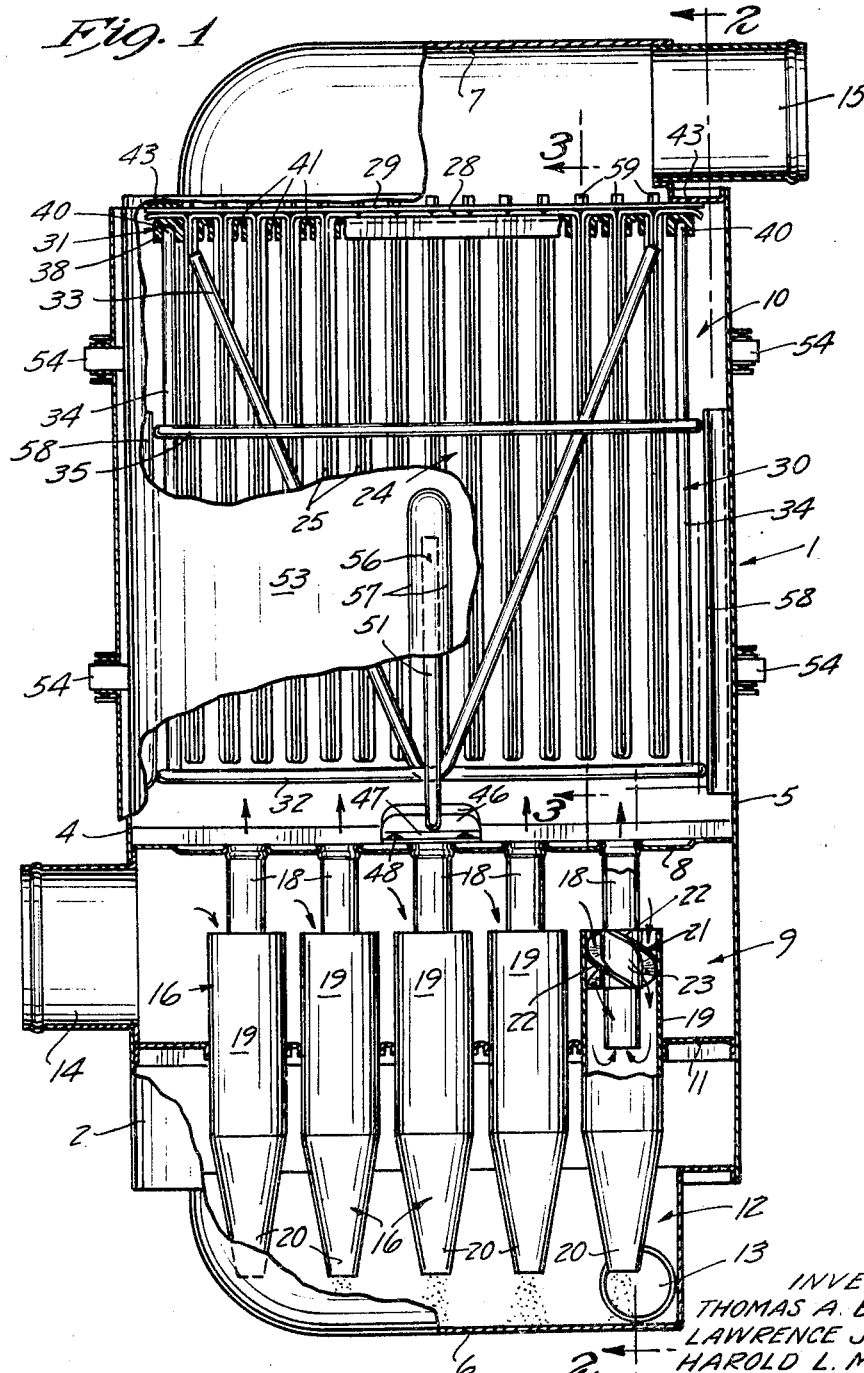
Fig. 1 is a view in side elevation of an air cleaner built in acordance with our invention, some parts being broken away and some parts shown in section.

In the preferred embodiment of our invention illustrated, an air cleaner is shown as comprising a housing 1 having front and rear walls 2 and 3 respectively, opposite end walls 4 and 5, a bottom 6 and a top 7. A horizontally disposed partition 8 divides the interior of the housing 1 into first and second chambers 9 and 10 respectively. A second horizontally disposed partition 11 defines the lower end of the first or inlet chamber 9 and is upwardly spaced from the bottom 6 of the housing 1, defining therewith a dust receiving chamber 12 from whence collected dust is removed through a discharge opening or passage 13. As will hereinafter be more fully described, dust laden air enters the chamber 9 through an inlet passage 14, and filtered air is removed from the upper end of the housing 1 through an outlet passage 15.

Mounted in and supported by the partition 11 is a plurality of pre-cleaner elements 16 each comprising inner and outer concentric tubes 18 and 19 respectively, the former extending above the upper ends of the latter and having their upper ends extending through and rigidly secured to the partition 8, see Figs. 1 and 2. As shown in Fig. 1, the lower end of the inner discharge tube 18 of each pre-cleaner 16 terminates in upwardly spaced relationship to the downwardly tapering lower end portions 20 of the outer or inlet tubes 19. Interposed between the upper end portion of each inlet tube 19 and its respective discharge tube 18 is a helical guide element 21 which causes the air entering the upper end of the inlet tube 19 to travel in a circular path as it moves downwardly through the inlet tube 19. The heavier dust particles entrained in the air are thrown laterally outwardly by centrifugal force and caused to move downwardly under action of gravity and centrifugal force to the lower tapered discharge end portions 20 from whence the same drops into the bottom 6 of the housing 1, while the air in the tubes 19 move laterally inwardly and upwardly through the discharge tubes 18 into the upper chamber 10. The air being discharged into the chamber 10 through the tubes 18 carries with it only a small percentage of the dust particles, these particles being of relatively small size and light weight insufficient to cause the same to be discharged downwardly into the bottom 6. The spiral guides 21 each comprise a central tubular sleeve 22 and a plurality of helical vanes 23. The tubular sleeve portion 22 is snugly received on the inner tube 18, the outer circumferential edges of the vanes 23 being snugly received in the upper end portions of the outer tubes 19 to prevent axial shifting of the guides 21 with respect to their respective tubes 18 and 19. However, if desired, any suitable means, not shown, may be utilized to positively prevent axial displacement of the guide elements 21. It will further be noted that the discharge tubes 18 provide inlet passages to the upper or filter chamber 10, the top 7 and outlet tube 15 providing outlet passages therefrom.

For the purpose of removing the relatively few dust particles from air entering the upper chamber 10 prior to passage thereof outwardly from the outlet 15, we provide a filter element 24 which comprises a plurality of upwardly opening pockets or the like 25 made from a single elongated strip of flexible porous sheet material such as woven cloth folded into accordion-type pleats, alternate pairs of such pleats being secured together at their side edge portions, such as by stitching or the like 26. The upper end of the stitching 26 of each pocket 25 is longitudinally spaced from the upper end of the stitching of an adjacent pocket so as to provide for joining or connecting portions 27 between the upper ends of each pocket 25. Inasmuch as each line of stitching 26 is inwardly spaced from its adjacent side edge of its respective pocket 25, the upper end of the filter element 24 turns outwardly to provide a peripheral flange 28 surrounding the entire element 24, which flange 28 provides a marginal mounting element for the filter 24. If desired, the pockets 25 may be made each from individual lengths of material and secured together at their upper ends by stitching or other well-known means. For the purpose of further strengthening the flange 28, we provide a gasket member 29, which may be made from the same fabric or material as the filter element 24, stitched or otherwise secured to the top surface of the flange 28. Mounting means for the filter element 24 includes an open mounting frame 30 comprising top and bottom frame members 31 and 32 respectively and generally V-shaped side and end frame members 33 and 34 respectively. The bottom frame member 32 together with an intermediate horizontally disposed frame member 35 is generally rectangular and is welded or otherwise secured to the lower ends of the V-shaped frame members 33 and 34, and the intermediate peripheral frame member 35 is likewise welded or otherwise rigidly secured to the intermediate portion of said frame members 33 and 34 to add rigidity to the frame structure. The top frame member 31 is formed as an integral unit and is generally rectangular in shape, being formed with recesses 36 at its corners for the reception of the outturned upper ends 37 of the frame members 33. The opposite ends 38 of the top frame member 31 are provided with recesses 39 for reception of the apex portions 40 of the inverted V-shaped end members 34. Furthermore, the top frame member 31 has integrally formed therewith a plurality of cross bars 41 which underlie and support the joining or connecting portions 27 of the filter pockets 25, said cross bars 41 defining apertures or slots 42 through which the filter pockets 25 extend. The peripheral portion of the top frame member 31 underlies the flange 28 and gasket element 29 to support the same in a relatively flat condition.

The housing structure 1 is formed at its upper end to provide a peripheral flange or shoulder 43 against which the top surface of the gasket element 29 is adapted to make sealing engagement. Means for supporting the frame 30 and filter element 24 in sealing engagement of the gasket element 29 with the shoulder 43 comprises a lever 44 in the nature of a crank having an intermediate journal 45 pivotally mounted on the inner adjacent upturned ends 46 of a pair of opposed leaf springs 47, the outer ends of which are riveted or otherwise rigidly anchored to the partition 8, as indicated at 48. The lever or crank 44 further comprises frame engaging and lifting legs 49 and 50, that are adapted to engage opposite sides of the frame member 32 intermediate the ends thereof to raise the frame 30 and filter element 24 into seating or sealing engagement of the upper flanged end thereof with the peripheral shoulder 43 of the housing structure 1.

The springs 47 yieldingly urge the lever 44 and parts carried thereby upwardly toward said engagement of the upper end of the filter element with the shoulder 43. With this arrangement, it is not necessary that the several parts comprising the frame 30 and the housing structure be held to extremely close dimensional tolerances in order that an effective seal be made at the shoulder 43. For the purpose of rotating or swinging the lever 44 about the axis of the journal portion 45 thereof to lock the filter 24 and frame 30 in place, or to release the same for removal from the housing structure, we provide a handle portion 51 which forms an extension of the frame engaging portion 50 and extends radially outwardly with respect thereto. In order that the filter element 24 together with its supporting frame 30 be easily removed from the chamber 10 and replaced therein, the front wall 2 of the housing structure 1 is formed to provide a relatively large opening 52 that is normally closed by a closure element 53 releasably held in place by conventional toggle-equipped latch elements 54. These locking devices, do not in themselves comprise the instant invention, and the same are not believed to require detailed description. Hence, for the sake of brevity, such detailed description is omitted. A suitable gasket 55 is interposed between the marginal edge portion of the closure element 53 and the underlying portion of the structure wall 2 about the opening 52 to seal the same against entry of air to the interior of the chamber 10 except as desired through the tube 18.

It will be noted that the opening 52 is of a size to permit the filter element 24 and its supporting frame 30 to be freely passed therethrough when the lever 44 is swung to its inoperative frame releasing position substantially at right angles to its position shown in Fig. 1. It will be further noted with reference to Figs. 2 and 5 that the handle portion 51 of the lever 44 is disposed laterally outwardly beyond the plane of the closure element 53 when the closure element is in engagement with the front wall 2. For the purpose of permitting the closure element 53 to properly close the opening 52 when the filter 24 and supporting frame 30 are properly seated against the shoulder 43, we preferably form the closure element 53 with an elongated recess or cavity 56 for reception of the handle portion 51 only when the same is in its upright operative position of Figs. 1, 2 and 5. The side walls 57 of the cavity 56 prevent accidental swinging movement of the lever 44 away from its operative frame supporting position when the closure element 53 is locked in place; and the laterally outward disposition of the handle portion 57 effectively prevents the closure element 53 from closing engagement with the front wall 2 except when the handle portion 51 is in its upright operative position. This construction prevents the operator or serviceman from improperly placing the filter element 24 and supporting frame 30 within the chamber 10. When placing the supporting frame 30 in the chamber 10 it will be noted that the same is properly located in a forward and rearward direction with the frame members 32 and 35 abutting the rear wall 3 of the housing structure 1. The supporting frame 30 is guided to its correct position laterally between the end walls 4 and 5 by guide plates or brackets 58 rigidly secured to the inner surfaces of the end walls 4 and 5, see Fig. 1.

With the filter element 24 correctly placed and seated in the chamber 10, air enters the chamber 10 from the tubes 18, passes through the walls of the pockets 25 to the interior thereof and from thence upwardly and outwardly through the outlet 15. For the purpose of keeping the opposite walls of each pocket 25 spaced apart so that filtered air may travel upwardly therebetween, we provide plate-like separator elements 59 one each disposed in each of the pockets 25, and which project upwardly therefrom into the interior of the housing top 7, see Fig. 1. The separator elements 59 are corrugated, as shown in Fig. 7 whereby to provide vertical air passages within the several pockets 25 to facilitate movement of filtered air upwardly to the outlet 15.

From the above, it should be obvious that removal and replacement of the filter element 24 may be accomplished quickly and easily. To remove the filter element 24, the operator unlocks the latches 54, removes the closure element 53 and swings the lever handle 51 to an inoperative release position angularly displaced substantially 90 degrees from its operative position shown in Fig. 1. The filter supporting frame 30 is then lifted out and removed to a desired location for cleaning. Inasmuch as the filter element 24 is suspended loosely within the frame 30, it is merely necessary that the frame and filter be shaken vigorously to cause the accumulated dust on the outer surfaces of the pockets 25 to become dislodged therefrom. Thereafter, the whole assembly may be replaced in the chamber 10, the lever 44 be moved to its operative position, see Figs. 1 and 2, and the closure element locked in place over the opening 52.

While we have shown and described a commercial embodiment of our novel air cleaner, it will be understood that the same is capable of modification without departure from the spirit and scope of the invention as defined in the claims.

What we claim is:

1. In an air cleaner, housing structure comprising relatively fixed walls and having an opening in one wall and a removable wall-forming closure element normally closing said opening, said structure defining a chamber, inlet and outlet passages communicating with said chamber in spaced relation to said closure element, a filter element, means mounting said filter element in said chamber between the inlet and outlet passages and including a shoulder for sealing engagement with a marginal edge portion of said filter element, and means for releasably holding said filter element in sealing engagement with said shoulder, said last mentioned means including a locking member mounted in said housing for movements between a filter element locking position and a filter element releasing position, said locking member in its released position engaging said closure, when said filter element is placed in said chamber and out of sealing engagement with said shoulder, to prevent closing movement of said closure against the wall portions of said housing structure defining said opening.

2. In an air cleaner, generally rectangular housing structure comprising relatively fixed walls and having an opening in one wall and a removable wall-forming closure element normally closing said opening, said structure defining a chamber, inlet and outlet passages communicating with said chamber in spaced relation to said closure element, a generally rectangular filter element, means mounting said filter element in said chamber between the inlet and outlet passages and including a laterally inwardly projecting peripheral shoulder extending about said chamber adjacent said outlet passage for sealing engagement with a marginal edge portion of said filter element, and means for releasably holding said filter element in sealing engagement with said shoulder, said means including a locking member mounted in said housing for movements between a filter element locking position and a filter element releasing position, said locking member in its released position engaging said closure element, when said filter element is placed in said chamber and out of sealing engagement with the shoulder, to prevent closing movement of said closure element against the wall portions of said housing structure defining said opening.

3. In an air cleaner, generally rectangular housing structure comprising relatively fixed walls and having an opening in one wall and a removable wall-forming closure element normally closing said opening, said structure defining a generally rectangular chamber, inlet and outlet passages communicating with said chamber in spaced relation to said closure element, a generally rectangular filter element including a marginal flange at one end thereof, means mounting said filter element in said chamber between said inlet and outlet passages and including a laterally inwardly projecting peripheral shoulder extending about said chamber adjacent the outlet passage for sealing engagement with said marginal flange, and means for releasably holding said flange in sealing engagement with said shoulder, said means including a locking member mounted in said housing for movements between a filter element locking position and a filter element releasing position, said locking member in its released position engaging said closure element, when said filter element is placed in said chamber and out of sealing engagement of said flange with said shoulder, to prevent closing movement of said closure element against the wall portions of said housing structure defining said opening.

4. In an air cleaner, housing structure comprising relatively fixed walls and having an opening in one wall and a removable wall-forming closure element normally closing said opening, said structure defining a chamber, inlet and outlet passages communicating with said chamber in spaced relation to said closure element, a filter element, and means mounting said filter element in said chamber between the inlet and outlet passages, said means comprising, a peripheral shoulder in said chamber for sealing engagement with a marginal edge portion of said filter element, a supporting frame for said filter element, said frame having a peripheral portion engaging said marginal portion of the filter element to support the same in sealing engagement with said shoulder, and frame engaging structure mounted in said housing for movements between an operative frame supporting position wherein said peripheral portion of the frame supports said marginal edge portion of the filter element in sealing engagement with said shoulder, and an operative release position wherein said filter element is free for removal from said chamber through said opening, said frame engaging structure including a locking member engaging said closure element when said filter element is placed in said chamber and out of sealing engagement with said shoulder, to prevent closing movement of said closure element against the wall portion of said housing structure defining said opening.

5. The structure defined in claim 4 in which said frame engaging structure comprises a lever pivotally mounted in said housing for swinging movements between said inoperative and operative positions, said lever having one portion engaging said frame and another portion engageable with said closure element when said lever is in its inoperative position to prevent closing of said closure element, said closure element defining a cavity for reception of said other portion of the lever when the same is in its operative position to permit closing engagement between the housing structure and said closure element, opposite side wall portions of said cavity providing means limiting movement of said lever toward its inoperative position when said closure element is in its closed position.

6. The structure defined in claim 5 in further combination with means yieldingly biasing said lever toward operative engagement with said supporting frame, and urging said lever and frame in a direction to effect sealing engagement between said marginal edge portion of the filter element and said shoulder when the said lever is in its operative position.

7. In an air cleaner, housing structure comprising relatively fixed walls and having an opening in one wall and a removable wall forming closure element normally closing said opening, said structure defining a chamber, inlet and outlet passages communicating with said chamber in spaced relation to said closure element, a filter element, and means mounting said filter element in said chamber between the inlet and outlet passages, said means comprising, a peripheral shoulder in said chamber for sealing engagement with a marginal edge portion of said filter element, a supporting frame for said filter element, said frame having a peripheral portion engaging said marginal portion of the filter element to support the same in sealing engagement with said shoulder, a lever having a portion engaging said frame, and means pivotally mounting said lever in said housing for swinging movements between an operative frame engaging position and an inoperative frame releasing position and for movements bodily toward and away from said shoulder, said lever being yieldably urged toward said shoulder and having a portion engageable with said closure when said filter is placed in said chamber and out of sealing engagement with said shoulder, to prevent closing movement of the closure element against the wall portion of said housing structure defining said opening.

8. In an air cleaner, housing structure comprising relatively fixed walls and having an opening in one wall and a removable wall forming closure element normally closing said opening, said structure defining a chamber, inlet and outlet passages communicating with said chamber in spaced relation to said closure element, a filter element, and means mounting said filter element in said chamber between the inlet and outlet passages, said means comprising, a peripheral shoulder in said chamber for sealing engagement with a marginal edge portion of said filter element, a supporting frame for said filter element, said frame having a peripheral portion engaging said marginal edge portion of the filter element to support the same in sealing engagement with said shoulder, a lever having a portion engaging said frame, and resilient means pivotally mounting said lever in said housing for swinging movements toward and away from operative engagement with said frame and yieldably urging said lever and frame bodily into engagement of said marginal edge portion of the filter with said shoulder when said lever is in its operative frame engaging position.

References Cited in the file of this patent

UNITED STATES PATENTS

| | | |
|---|---|---|
| 1,049,789 | Williamson | Jan. 7, 1913 |
| 1,746,283 | Reed et al. | Feb. 11, 1930 |
| 1,779,458 | Annis | Oct. 28, 1930 |
| 2,322,948 | Lofgren | June 29, 1943 |
| 2,569,222 | Beede et al. | Sept. 25, 1951 |
| 2,580,648 | Blair et al. | Jan. 1, 1952 |
| 2,742,105 | Dow | Apr. 17, 1956 |
| 2,770,321 | Brochetti | Nov. 13, 1956 |

FOREIGN PATENTS

| | | |
|---|---|---|
| 2,110 | Great Britain | Feb. 6, 1889 |
| 725,712 | Great Britain | Mar. 9, 1955 |
| 166,481 | Switzerland | Mar. 1, 1934 |